(12) United States Patent
Berger et al.

(10) Patent No.: US 8,108,424 B2
(45) Date of Patent: Jan. 31, 2012

(54) METHOD AND DEVICE FOR TRANSPORTING OBJECTS

(75) Inventors: Gisbert Berger, Berlin (DE); Katja Worm, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 12/325,552

(22) Filed: Dec. 1, 2008

(65) Prior Publication Data

US 2009/0177632 A1  Jul. 9, 2009

(30) Foreign Application Priority Data

Nov. 30, 2007 (DE) .......................... 10 2007 058 162
Jan. 16, 2008 (DE) .......................... 10 2008 004 655
Apr. 4, 2008 (DE) .......................... 10 2008 017 188

(51) Int. Cl.
 *G06F 17/30* (2006.01)
(52) U.S. Cl. ...................................................... 707/772
(58) Field of Classification Search .................. None
See application file for complete search history.

(56) References Cited

U.S. PATENT DOCUMENTS

| | | |
|---|---|---|
| 6,703,574 B1 | 3/2004 | Kechel et al. |
| 6,888,084 B1 | 5/2005 | Bayer |
| 2006/0253406 A1 | 11/2006 | Caillon |

FOREIGN PATENT DOCUMENTS

| | | |
|---|---|---|
| DE | 19625007 A1 | 1/1998 |
| DE | 19947259 C1 | 9/2000 |
| EP | 0948416 B1 | 11/2001 |
| EP | 1222037 B1 | 7/2002 |

*Primary Examiner* — Baoquoc To (74) *Attorney, Agent, or Firm* — Laurence A. Greenberg; Werner H. Stemer; Ralph E. Locher (57) ABSTRACT

A method and device for transporting a plurality of objects, such as mail items. In a plurality of transport operations, at least one object is transported to a processing system in each case. For each object, two measurements are taken to determine which value is assumed by a predetermined feature for the object. The first measurement is taken before initiating the respective transport operation and the new or second measurement is taken after the transport operation is initiated. For each transport operation, transport operation information concerning which objects are transported together by the transport operation and which predetermined feature value of the objects measured at the time of the first measurement is determined and stored. For each object, a search is then conducted to determine in which transport operation the object was transported. In this case, a restriction is imposed on the search for at least one transport operation. In the process, for each transport operation it is determined for each case wherein at least n objects having the n measured feature values were placed together and transported into a particular transportation unit.

9 Claims, 10 Drawing Sheets

METHOD AND DEVICE FOR
TRANSPORTING OBJECTS

BACKGROUND OF THE INVENTION

Field of the Invention

The invention relates to a method and to a device for transporting a plurality of objects, in particular mail items.

A mail item typically passes at least twice through a sorting system and is then transported to the destination address specified in each case. On the first pass the destination address of the mail item is read. On the second pass the read destination address is determined again.

Traditionally an encoding of the destination address is printed onto the mail item during the first pass. Said encoding is read during the second pass. In order to avoid the printing of mail items, it is proposed in DE 4000603 C2 to measure a feature vector of the mail item during the first pass and to store said feature vector together with the read destination address. The mail item is measured again during the second pass, a further feature vector being generated as a result. Said further feature vector is compared with the stored feature vectors in order to find the stored feature vector of the same object. The destination address which is stored together with the found feature vector is used as that destination address to which the mail item is to be transported.

This search requires many feature vectors to be compared with one another, which is a time-consuming process. As the number of transported mail items grows, there is an increasing risk that the wrong feature vector will be found among the stored feature vectors. For that reason restrictions on the search space have already been proposed.

A method having the features of the preamble of claim 1 and a device having the features of the preamble of claim 9 are known from EP 1222037 B1. There it is described how the search space is restricted during the search for a stored data record for a mail item. The transport means in which the mail items are conveyed are containers which are provided with machine-readable identifiers. Said identifiers are determined and used during the search for data records. The search is restricted to the data records of mail items from said container.

This approach requires that the identifier of the container is read reliably. In practice reading the identifier without error is sometimes not successful.

BRIEF SUMMARY OF THE INVENTION

The object underlying the invention is to provide a method having the features of the preamble of claim 1 and a device having the features of the preamble of claim 9, wherein the search for the transport operation neither requires the transport means to be transported in a specific order to the processing system nor requires an identifier of a transport means to be read following the transportation of the transport means to the respective processing system.

The object is achieved by means of a method having the features of claim 1 and a device having the features of claim 9. Advantageous embodiments are set forth in the dependent claims. With the method according to the invention, a plurality of transport operations are performed. At a minimum, the following steps are performed in each of said transport operations:

At least one object is placed in a transport means in each case. It is possible for a different transport means to be used for each transport operation or for the same transport means to be used for a plurality of transport operations.

The transport means containing the at least one object is transported to a processing system.

The objects transported using the transport means are supplied to the processing system. The objects are supplied to it in such a way that all the objects from said transport means are supplied to the processing system first, before further objects are supplied to the processing system. Said further objects can originate from other transport operations.

In addition the following steps are performed:

For each object, a first measurement is taken to determine which value is assumed by a predefined feature for said object. The first measurement is performed before said object has been placed into the respective transport means.

For each transport operation, the transport operation information is determined and stored, said information detailing which objects will be transported together by means of said transport operation and which feature value will be assumed by which of said objects in each case at the time of the first measurement.

For each object, a second measurement is taken to determine which value will be assumed by the feature for said object. The new measurement is performed after the object has been supplied to the respective processing system.

A search is then conducted to discover by means of which transport operation said object has been transported.

During this search the following steps are performed in addition for at least one transport operation:

The new measurements are taken for n objects that have been transported together by means of said transport operation. In this case n>=2 applies. Said n measurements yield n feature values.

Each transport operation having the following characteristic is determined: by means of the transport operation, at least n objects having the n measured feature values have been placed in each case into the transport means that is being used for the transport operation, and transported in said transport means. It is possible for further objects to be transported in said transport means in addition to said n objects.

The n feature values and the stored transport operation information are used for determining said transport operations. The determining process can yield no transport operation, one transport operation or more than one transport operation.

For each object that has been supplied to the processing system by means of a determined transport operation, the determined transport operation is used as the result of the search.

According to the invention a preselection from among the transport operations is therefore made during the search. Prior to the search, n objects are measured in advance. Next, the search is conducted. The search yields a preselection from among transport operations and effects a restriction of the search space. The stored transport operation information and the n feature values are used in order to perform the search. It is not necessary to ascertain the identifier of a transport means after said transport means has been transported to the processing system. The order in which objects are placed into a transport means or supplied to a processing system is likewise not required.

The invention can be used e.g. for processing and sorting mail items, items of baggage belonging to travelers, and also containers or other packages.

In one embodiment an identification of a destination point to which the object is to be transported, or an identification of an owner of the object, is read. The destination point is e.g. a delivery address for a mail item or a factory production line or a destination rail station or destination seaport or destination airport for an item of baggage or a package.

The invention is illustrated below with reference to an exemplary embodiment and accompanying figures, in which:

DESCRIPTION OF THE INVENTION

In the exemplary embodiment the objects requiring to be transported are mail items. Each mail item is provided with an identification indicating the delivery address to which said mail item is to be transported. The delivery address acts as the destination point of the mail item. As a rule the identification has been applied to the mail item prior to the start of the transportation. However, it is also possible for it to be attached only during the transportation.

Each mail item passes through a sorting system at least twice. It is possible for a mail item to pass through the same sorting system multiple times or to pass through a sorting system three times.

At a minimum, the delivery address is determined on the first pass. It is possible for further features to be measured, e.g. the weight of the mail item or with what franking the mail item is provided.

Preferably a reading device of the sorting system used for the first pass attempts, initially automatically using "Optical Character Recognition" (OCR), to ascertain the delivery address automatically. If this is not successful, a person will read the delivery address and input at least a part of the read delivery address, e.g. the zip code.

A delivery region is assigned to each possible delivery address. On each pass, all mail items addressed to the same delivery region are discharged into the same collector bin. It is possible for mail items addressed to different delivery regions to be discharged into the same collector bin. It is possible for a mail item to pass through the same sorting system multiple times, for example because the number of collector bins is less than the number of predefined delivery regions. In this case an "n-pass sequencing" method is preferably performed. A method of said kind is known from EP 948416 B1. After the first pass the mail items that the sorting system has discharged into a collector bin are placed into a container. The container is transported to the feeder device of the second sorting system, and the mail items are supplied to the sorting system for the second pass.

It is also possible for a container containing mail items that have passed through a sorting system for the first time to be transported to a different location and for the mail items to be supplied to a further sorting system at that location. It is also possible for some mail items from a collector bin of the further sorting system to be transported in a container to a feeder device of another sorting system and for said mail items to be supplied to the other sorting system.

It would be very disadvantageous if each further sorting system were to have to re-read the delivery address that has already been read by the first sorting system. The conventional approach to avoiding this is for the first sorting system to print an encoding of the delivery address onto the mail item, e.g. in the form of a pattern of bars ("bar code"). Each further sorting system reads said bar code.

Frequently, however, it is not desired that a mail item be provided with a bar code. An agreement of the Universal Postal Union (UPU) provides that mail items crossing national boundaries should not be provided with a bar code, because different postal service providers usually use different systems of encoding.

In the exemplary embodiment, therefore, a method is applied which has become known under the designation "fingerprint" or also "virtual ID" and is described e.g. in DE 4000603 C2 and EP 1222037 B1 and which enables each further sorting system to ascertain the delivery address read by the first sorting system without a bar code.

In the exemplary embodiment different features of a mail item are predefined which can be measured optically while the mail item passes through a sorting system, without damaging the mail item. Examples of features of this kind are
- dimensions of the mail item,
- the distribution of grayscale values and/or color tones on a surface of the mail item,
- the position and dimension of the franking mark,
- the position and size of the address block and/or an identification of the sender, and
- features of the delivery address, e.g. the zip code.

Figure 1:
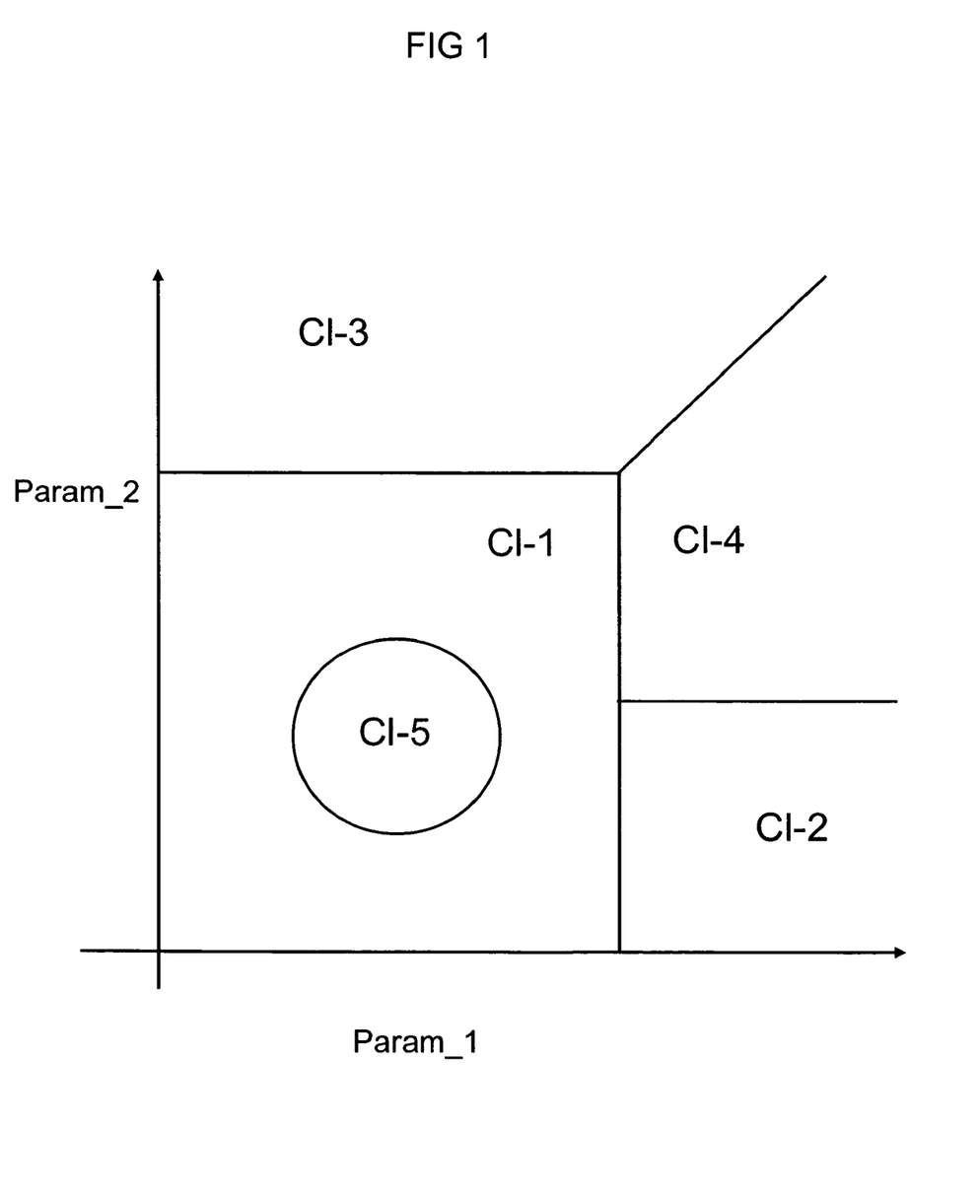
FIG. 1 shows an exemplary breakdown of the feature space.

FIG. 1 illustrates an exemplary breakdown of the feature space. In this illustrative example, two features of each mail item are measured, namely Merk-1 and Merk-2. The value range of Merk-1 is plotted on the x axis, that of Merk-2 on the y axis. Thus, each possible feature value is a tuple. In the example the space spanned by the x axis and the y axis is subdivided into five subsets, namely Cl-1 to Cl-5. The delimiting lines of said subsets do not necessarily run parallel to the coordinate axes. Said five subsets are referred to below as "clusters".

Figure 2:
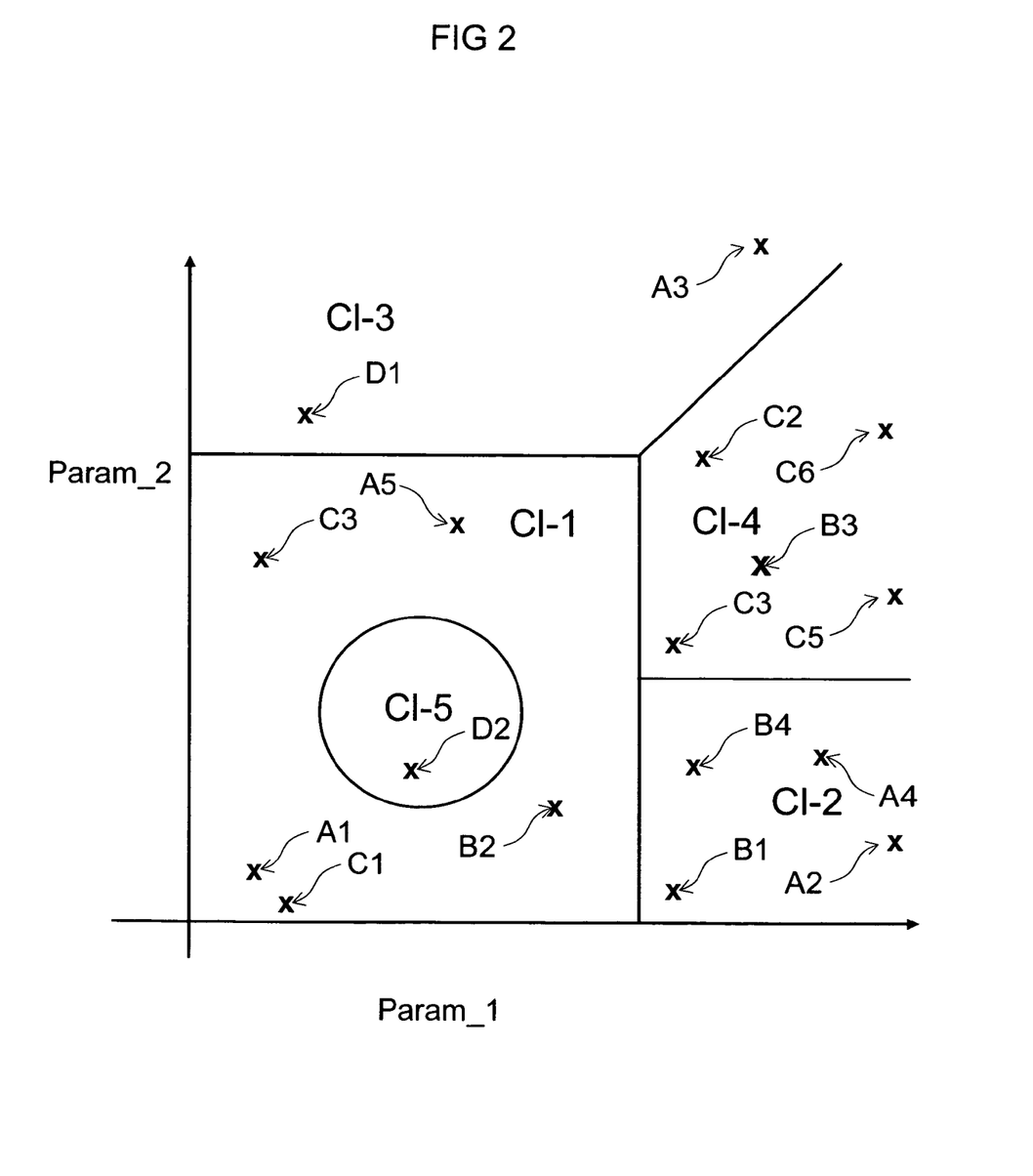
FIG. 2 shows the position of the measured values in the feature space of FIG. 1.

In the exemplary embodiment at least two measurements are taken to determine which values are assumed by the two features Merk-1 and Merk-2 for the mail items A1, ..., A5, B1, ..., B4, C1, ..., C6, D1 and D2. For each mail item, therefore, a value of the feature Merk-1 and a value of the feature Merk-2 are measured twice in each case. FIG. 2 shows the position of said tuples of measured values in the coordinate system and hence in the feature space of FIG. 1. The figure also shows in which of the five clusters Cl-1, ..., Cl-5 each tuple falls in each case. The tuple having the two measured values for the mail item D1 falls into the cluster Cl-3, that for D2 into the cluster Cl-5.

Figure 3:
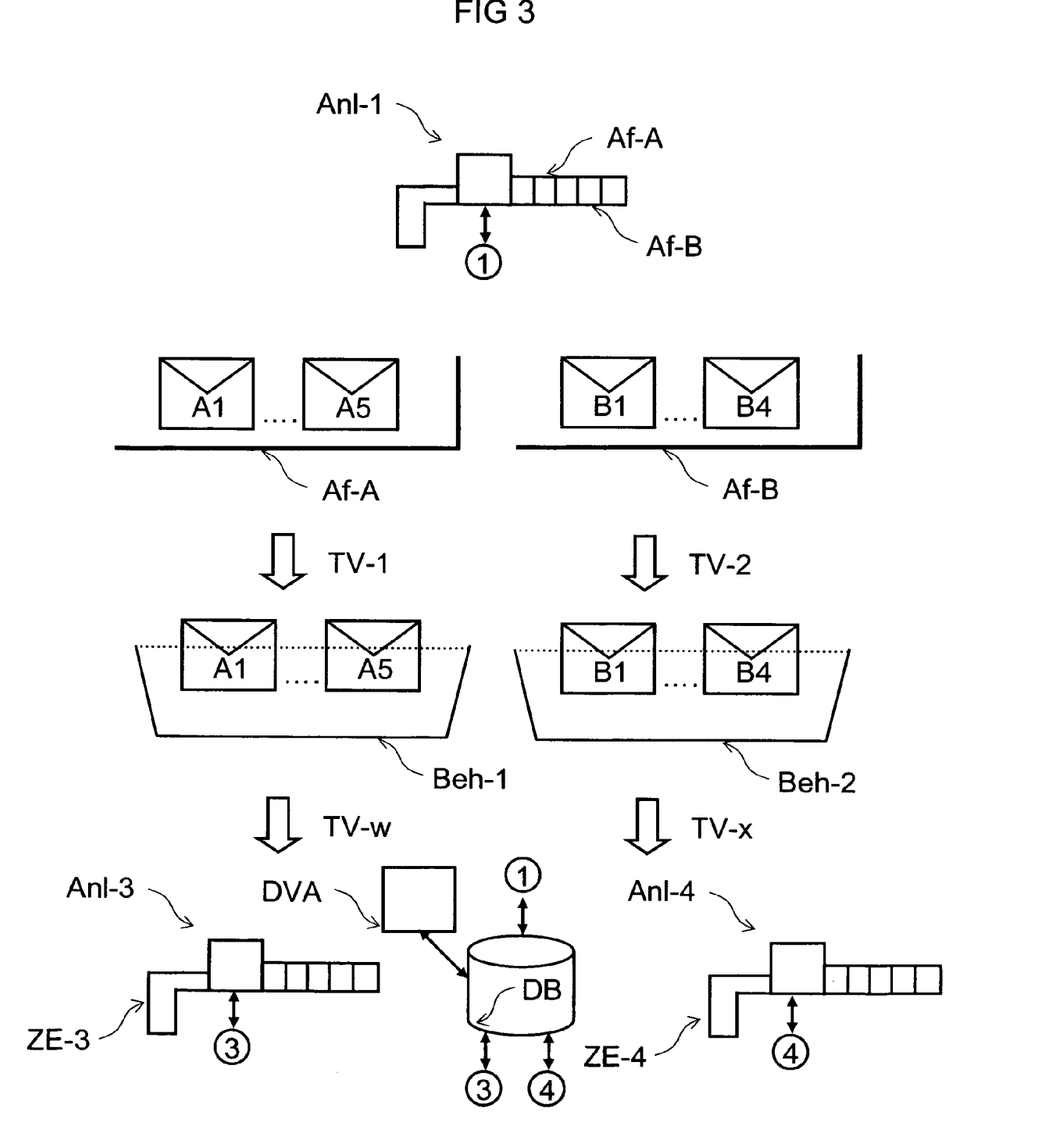
FIG. 3 shows the transportation of the mail items A1, ..., A5 and B1, ..., B4.

FIG. 3 illustrates the transportation of the mail items A1, ..., A5 and B1, ..., B4. The mail items A1, ..., A5 and B1, ..., B4 pass through a first sorting system Anl-1. A reading device of said first sorting system Anl-1 reads the respective identification of the delivery address with which the mail items A1, ..., A5, B1, ..., B4 and further mail items passing through are provided. A measuring device of the first sorting system Anl-1 measures which values are assumed by the predefined features for the mail items A1, ..., A5. Said measuring device Anl-2 also measures which values are assumed by the predefined features for the mail items B1, ..., B4.

Figure 4:
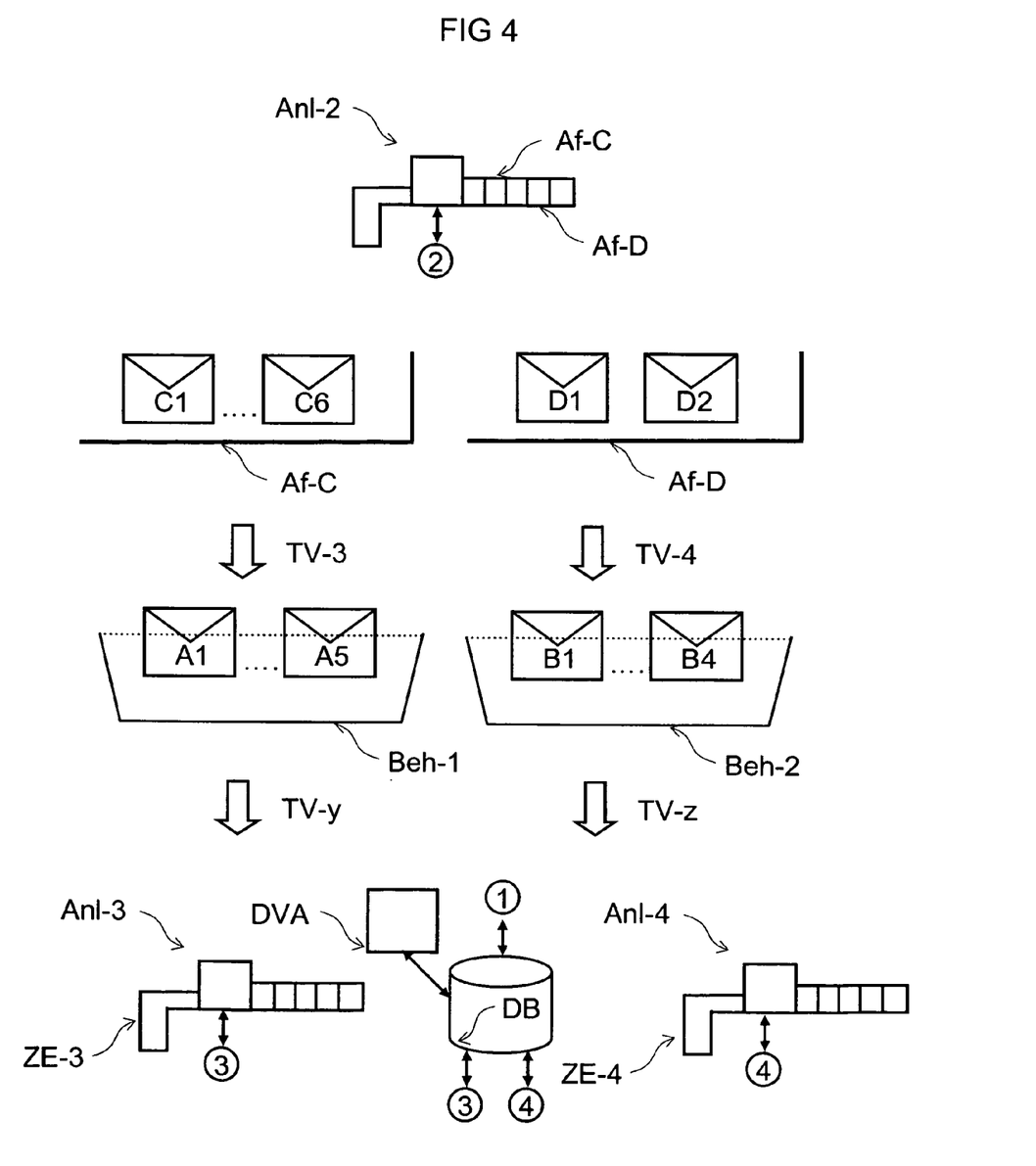
FIG. 4 shows the transportation of the mail items C1, ..., C6 and D1 and D2.

FIG. 4 illustrates the transportation of the mail items C1, C6 and D1 and D2. The mail items C1, ..., C6 pass through a second sorting system Anl-2. A reading device of said second sorting system Anl-2 reads the respective identification of the delivery address with which the mail items C1, ..., C6, D1, D2 and further mail items passing through are provided. A measuring device of the second sorting system Anl-2 measures which values are assumed by the predefined features for the mail items C1, ..., C6. Said measuring device also measures which values are assumed by the predefined features for the mail items D1 and D2.

As soon as a mail item passes through a sorting system for the first time, a data record for said mail item is created and stored in a central database DB. Said data record comprises
an internal identifier for the mail item,
the read identification of the delivery address of the mail item,
the feature values measured for said mail item,
and preferably the information indicating to which cluster the feature values measured for said mail item belong.

The identifier distinguishes the mail item from all other mail items that pass through one of the sorting systems within a specific time period. The time period is e.g. ten days long.

Each sorting system used for transporting the mail items has read and write access to said central database DB. In the example shown in the figures the four sorting systems Anl-1, Anl-2, Anl-3 and Anl-4 have read and write access to said central database DB.

Depending on the read delivery address, the first sorting system Anl-1 discharges each mail item passing through into one of its collecting devices. Before being discharged the mail items pass through the first sorting system Anl-1 in a stream of successive objects. The first sorting system Anl-1 discharges individual mail items from the stream by directing them into one of the collector bins.

In the example shown in FIG. 3, the first sorting system Anl-1 discharges the mail items A1, ..., A5 into the collector bin Af-A and the mail items B1, ..., B4 into the collector bin Af-B.

In the example shown in FIG. 4, the second sorting system Anl2 discharges the mail items C1, ..., C6 into the collector bin Af-C and the mail items D1, D2 into the collector bin Af-D.

From time to time mail items are removed from each collector bin and placed into a container. Said containers act as transport means. It is possible for a collector bin to be completely emptied in this process. It is also possible for one or more mail items to remain in the collector bin in this case, e.g. because not all the mail items in the collector bin fit into the container.

Each container into which mail items from the collector bin are placed is preferably provided with a label. In the exemplary embodiment this label specifies to which location the container containing the mail items is to be transported. This location is referred to in the following as the "intermediate point" because it is an intermediate point on the path of the mail items in the container to the respective delivery address. The label can be paper-based or comprise an electronic data carrier. The intermediate point is recorded on the label in human-readable and/or machine-readable form.

In the example shown in FIG. 3, the mail items A1, ..., A5 from the collector bin Af-A are placed into a first container Beh-1 and transported away. The mail items B1, ..., B4 are removed from the collector bin Af-B, placed into a second container Beh-2 and transported away.

In the example shown in FIG. 4, the mail items C1, ..., C6 from the collector bin Af-C are placed into the already used first container Beh-1 and transported away. The mail items D1 and D2 are removed from the collector bin Af-D and placed into the already used second container Beh-2 and transported away. Therefore the containers Beh-1 and Beh-2 are both used twice.

In the exemplary embodiment the intermediate point is a feeder device to a further sorting system, for example an "input unit" ("feeder") of said further sorting system. The container containing the mail items is transported to said intermediate point and emptied there. The mail items from the container are supplied to the further sorting system by means of the feeder device. Said further sorting system determines the delivery address of each mail item that the first sorting system has read. Next, the further sorting system in turn discharges the mail item into one of its collector bins in accordance with the delivery address. The transportation of the mail item to said delivery address is initiated.

In the example shown in FIG. 3, the mail items A1, ..., A5 in the first container Beh-1 are transported from the collector bin Af-A to the feeder device ZE-3 of a third sorting system Anl-3. Said transportation forms the transport operation TV-1. The mail items B1, ..., B4 are transported from the collector bin Af-B in the second container Beh-2 to the feeder device ZE-4 of a fourth sorting system Anl-4. Said transportation forms the transport operation TV-2.

In the example shown in FIG. 4, the mail items C1, ..., C6 in the first container Beh-1 are transported from the collector bin Af-C to the feeder device ZE-3 of the third sorting system Anl-3. Said transportation forms the transport operation TV-3. The mail items D1 and D2 are transported from the collector bin Af-D in the second container Beh-2 to the feeder device ZE-4 of the fourth sorting system Anl-4. Said transportation forms the transport operation TV-4.

In the exemplary embodiment a transport operation is therefore characterized by:
a collector bin of a sorting system as the starting point of the transport operation,
a feeder device of a sorting system as the destination point of the transport operation and
the mail items that are transported in this transport operation.

In the exemplary embodiment each sorting system registers which mail items it discharges into which collector bin and into which cluster the feature values of said mail item fall. In addition each sorting system registers which transport operations originate from that sorting system.

Figure 5:
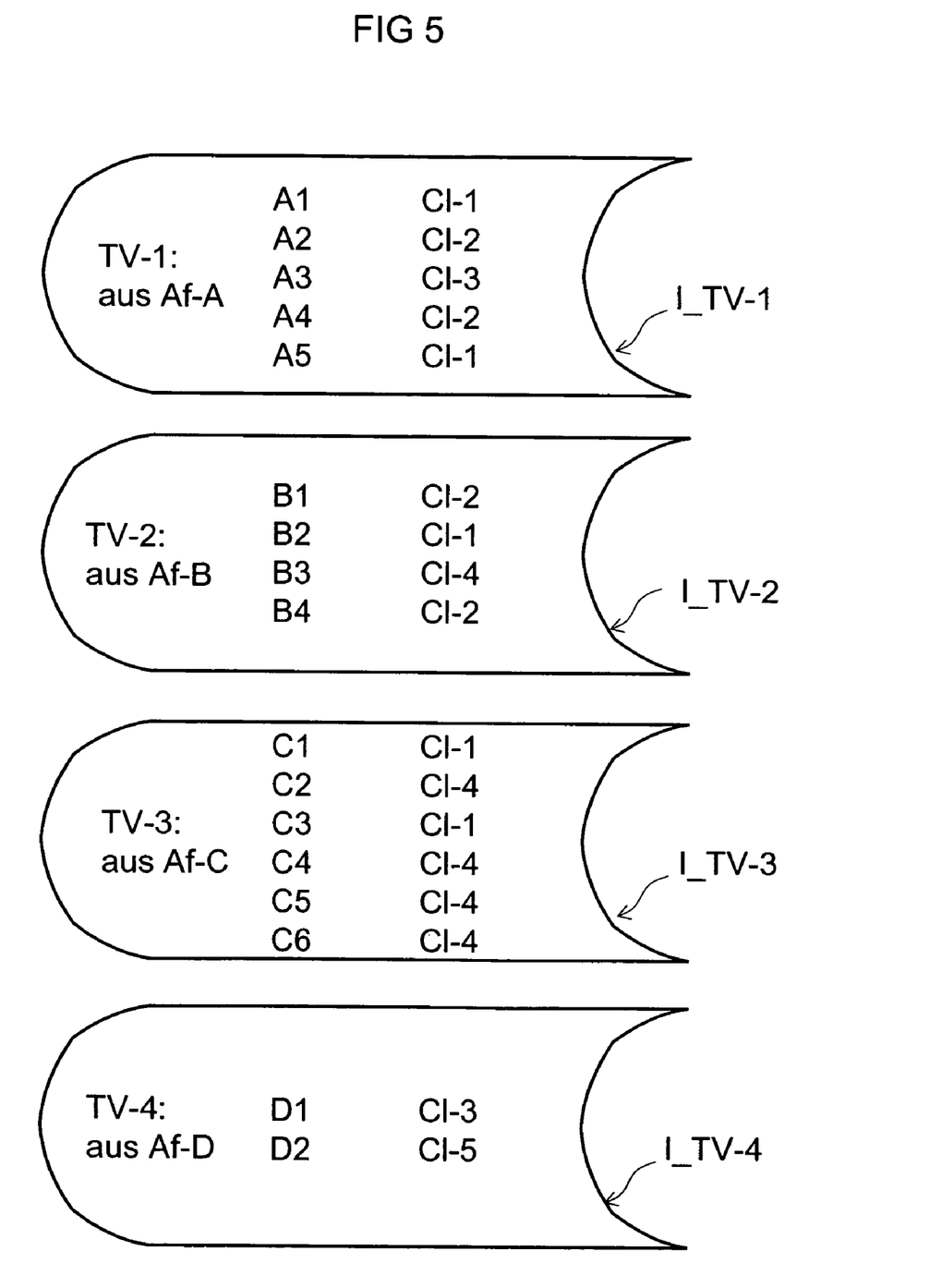
FIG. 5 shows which information about transport operations is stored.

FIG. 5 illustrates which information concerning transport operations is registered by the first sorting system Anl-1 and the second sorting system Anl-2. This transport operation information I TV-1, I TV-2, I TV-3, I TV-4 is also stored in the central database DB.

The following transport operation information I TV-1 relating to the first transport operation TV-1 is stored:

| Collector bin | Mail item | Cluster of this mail item |
|---|---|---|
| Af-A | A-1 | Cl-1 |
| Af-A | A-2 | Cl-2 |
| Af-A | A-3 | Cl-3 |
| Af-A | A-4 | Cl-2 |
| Af-A | A-5 | Cl-1 |

The corresponding transport operation information I TV-2, I TV-3, I TV-4 is also stored in relation to the remaining three transport operations TV-2, TV-3 and TV-4.

In the transport operation TV-1, the mail items A-1, . . . , A-5 from the collector bin Af-A of the first sorting system Anl-1 are transported in the first container Beh-1 to the feeder device ZE-3 of the third sorting system Anl-3. However, the invention spares the necessity for the third sorting system Anl-3 to measure an identifier of the first container Beh-1 and register a time at which the transport operation TV-1 was started or terminated. It is sufficient for the third sorting system Anl-3 to register that a transport operation TV-w reaches the feeder device ZE-3. The third sorting system Anl-3 also registers which mail items passing through the third sorting system Anl-3 have been transported to the third sorting system Anl-3 in said transport operation TV-w. Accordingly the fourth sorting system Anl-4 registers that a transport operation TV-x having the mail items B-1, . . . , B-4 reaches the feeder device ZE-4.

The mail items A1, . . . , A5 are singulated by the feeder device ZE-3 of the third sorting system Anl-3. A measuring device of the third sorting system Anl-4 measures for a second time which values are assumed by the predefined features for the mail items A1, . . . , A5. In the exemplary embodiment, these are the values of the two features Merk-1 and Merk-2. The mail items B1, . . . , B4 are singulated by the feeder device ZE-4 of the fourth sorting system Anl-4. A measuring device of the fourth sorting system Anl-4 measures for a second time which values are assumed by the predefined features for the mail items B1, . . . , B4. The same applies analogously to the mail items C1, . . . , C6, D1 and D2.

Whenever a mail item passes through a sorting system another time, a search is conducted in the central database DB for the data record that was stored for that mail item. Thus, when the mail item A-1 passes through the third sorting system Anl-3, a search is conducted in the central database DB for the data record for the mail item A-1. Said data record was created when the mail item A-1 passed through the first sorting system Anl-1.

Each data record for a mail item includes
the read identification of the delivery address of the mail item,
the feature values measured for that mail item
and preferably the information indicating to which cluster the feature values measured for that mail item belong.

Also stored is the information concerning by means of which transport operation—or which transport operations—each mail item is conveyed away from a sorting system. This information is stored as part of the transport operation information.

In order to find said data record, the feature values measured for a mail item when the measurement is repeated are compared with feature values of stored data records. Said comparison is performed automatically by a data processing system DVA that is connected to the central database DB. It would be very time-consuming if during that process it were to be necessary for the measured feature values to be compared with the feature values of all stored data records. A preselection is therefore made from among the stored data records.

A number n>=2 is predefined. The n measurements of the m feature values in each case are performed for n mail items that were transported together by means of the same transport operation. This yields n measurement results having m feature values in each case. In the exemplary embodiment m=2 is used.

Each outgoing transport operation is determined by means of which at least n mail items having the n measured measurement results have been placed together in each case into one container and transported in the latter to the sorting system. The n measurement results and the stored transport operation information are used for said determining process. During said determining at least one transport operation is determined each time, namely the transport operation in which said n mail items were transported. It is possible for further transport operations to be determined in addition, i.e. those operations in which similar n objects were transported.

During the search in the central database DB, for said n mail items the search is restricted to those data records that were stored for mail items that were transported in the at least one determined transport operation.

FIG. 6 to FIG. 10 illustrate this determining of the transport operation.

Figure 6:
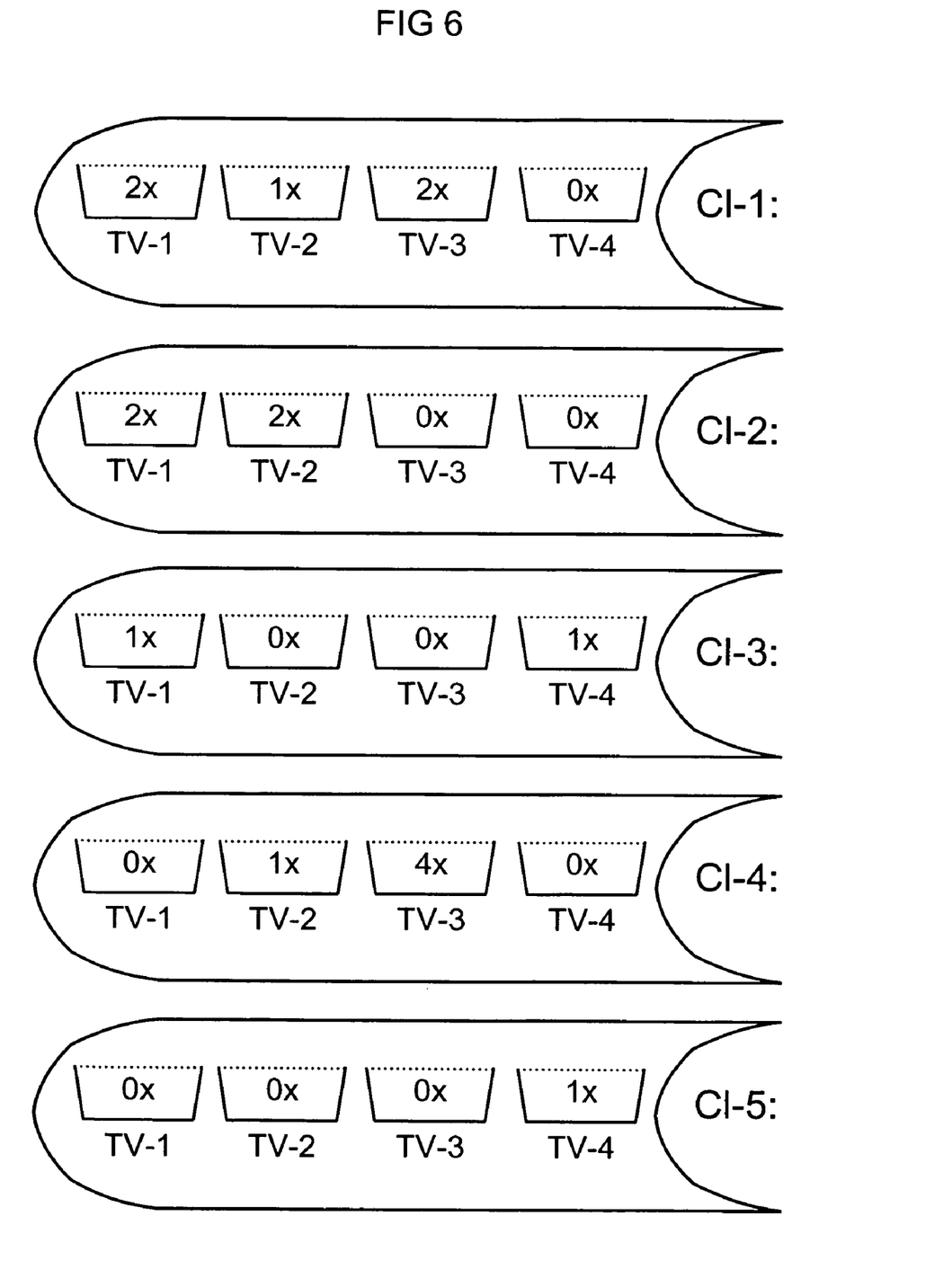
FIG. 6 shows the transformed transport operation information.

The data processing system DVA automatically processes the transport operation information I TV-1, I TV-2, I TV-3, I TV-4 auf. It is determined for each cluster how many mail items belonging to said cluster were transported in which outgoing transport operation. In FIG. 6 this is illustrated for the five clusters Cl-1, Cl-2, Cl-3, Cl-4 and Cl-5 from FIG. 1. The following information is determined for the cluster Cl-1:

| Outgoing transport operation | Number of mail items in Cl-1 |
|---|---|
| TV-1 | 2 |
| TV-1 | 1 |
| TV-1 | 2 |
| TV-1 | 0 |

In the exemplary embodiment, n=3 is used. As already mentioned above, the mail items A-1, . . . , A-5 reach the feeder device ZE-3 of the third sorting system Anl-3 in the transport operation TV-w. The third sorting system Anl-3 registers that the mail items A-1, . . . , A-5 reach the feeder device ZE-3 together in one transport operation TV-w. A measuring device of the third sorting system Anl-3 measures the first n=3 mail items. By this means it is established that the first mail item (i.e. A-1) belongs to the cluster Cl-1, the second mail item (i.e. A-2) to the cluster Cl-2, and the third mail item (i.e. A-3) to the cluster Cl-3.

Figure 7:
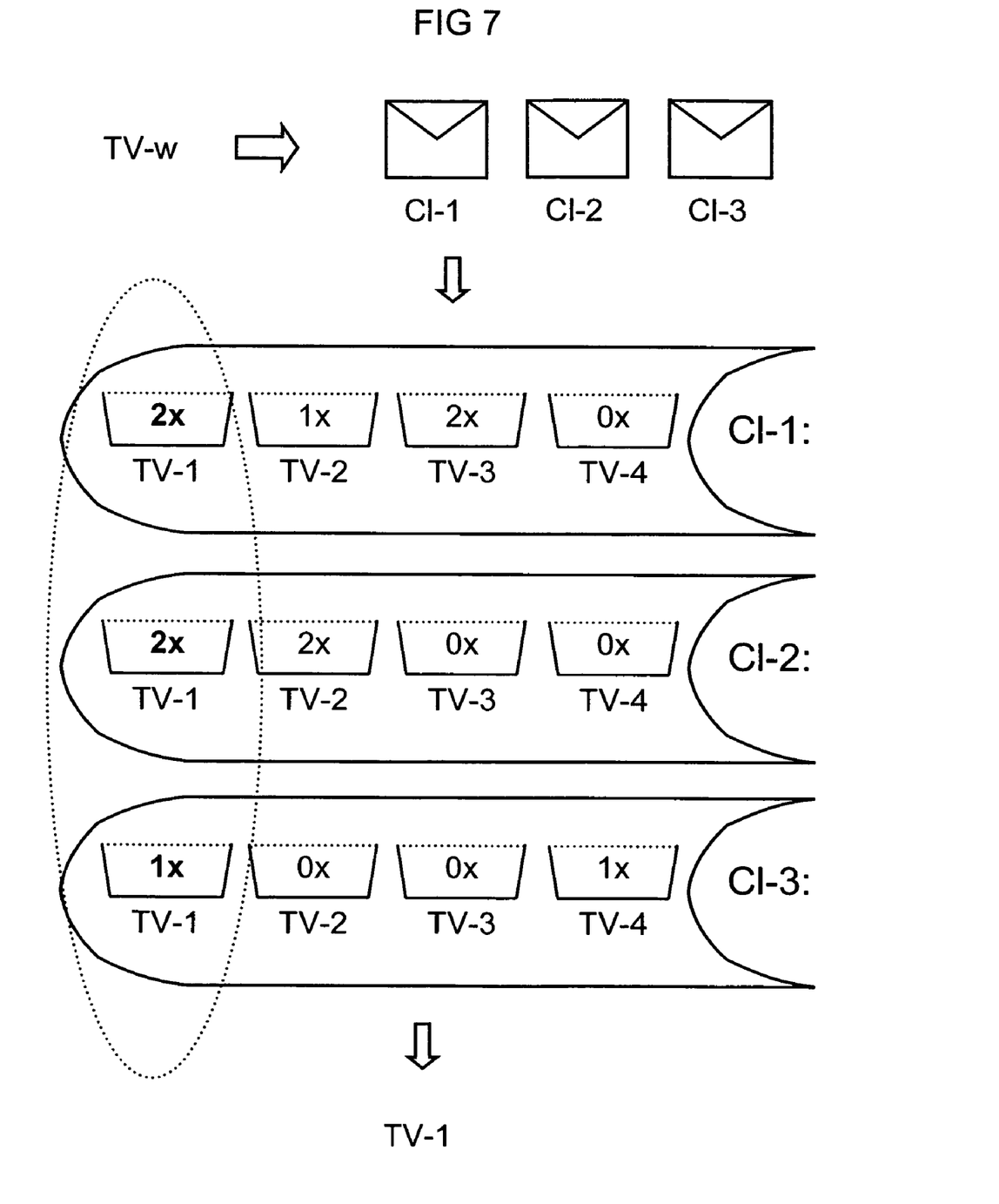
FIG. 7 shows the determining of the transport operation for the mail items A-1, ..., A-5 of the transport operation TV-w.

FIG. 7 illustrates the evaluation of this result. FIG. 7 also illustrates how it is determined in which of the four outgoing transport operations TV-1, TV-2, TV-3 or TV-4 the first n=3 incoming mail items are transported. In this example not even the number of mail items is required for determining the result.

Of the first three mail items to arrive, one belongs to the cluster Cl-1, one to Cl-2 and one to Cl-3. FIG. 7 shows the three transformed items of transport operation information from FIG. 6 for the three determined clusters Cl-1, Cl-2 and Cl-3.

At least one mail item from Cl-1, Cl-2 and Cl-3 was transported in each case in the transport operation TV-1. The transport operation TV-1 is therefore determined.

No mail item of the cluster Cl-3 was transported in the transport operation TV-2. TV-2 is therefore not determined.

No mail item of the cluster Cl-2 was transported in the transport operation TV-3. TV-3 is therefore not determined.

No mail item of the cluster Cl-1 and also no mail item of the cluster Cl-2 were transported in the transport operation TV-4. TV-4 is therefore not determined.

The outgoing transport operation TV-1 is therefore determined as the only transport operation for the five mail items A1, ..., A-5. The incoming transport operation TV-w can only correspond to the outgoing transport operation TV-1. The stored transport operation information I TV-1 reveals that the mail items A1, ..., A-5 were transported in the transport operation TV-1. The determined transport operation is represented in bold in FIG. 7.

The five data records for the five mail items that were transported in the transport operation TV-1 are then searched for the data record that was stored for the first mail item A-1 of the incoming transport operation TV-w. This search space restriction reduces the search time considerably.

Figure 8:
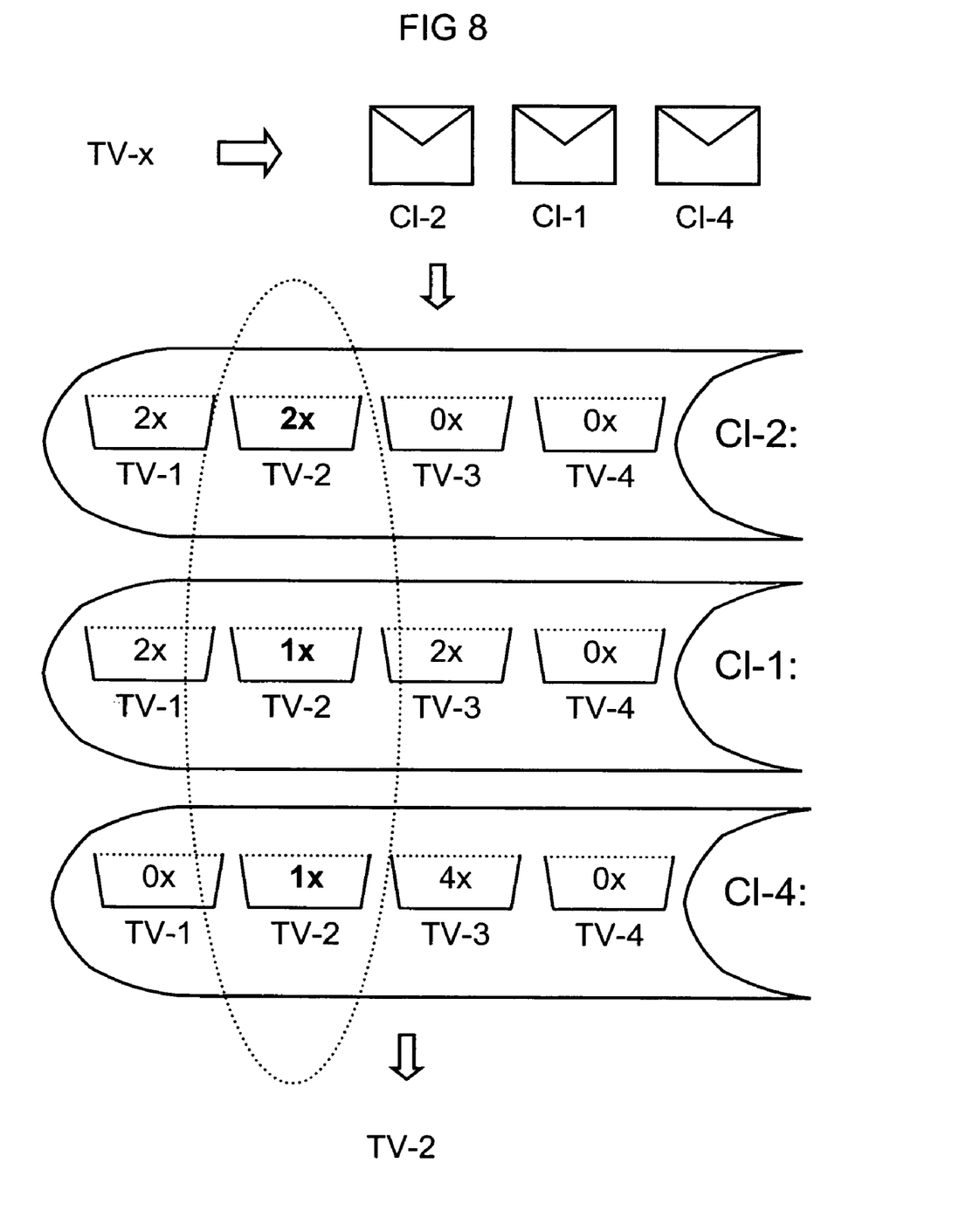
FIG. 8 shows the determining of the transport operation for the mail items B-1, ..., B-4 of the transport operation TV-x.

FIG. 8 illustrates the determining of the outgoing transport operation for the mail items of the incoming transport operation TV-x. The four mail items B-1, ..., B-4 are transported to the feeder device ZE-4 of the fourth sorting system Anl-4 by means of the transport operation TV-x.

The feature values of the first three mail items, i.e. B-1, B-2 and B-3, are measured. It is determined in this process that the first mail item (i.e. B-1) belongs to the cluster Cl-2, the second mail item (i.e. B-2) to the cluster Cl-1, and the third mail item (i.e. B-3) to the cluster Cl-4.

Of the first three incoming mail items, one therefore belongs to the cluster Cl-2, one to Cl-1, and one to Cl-4. FIG. 8 shows the three transformed items of transport operation information from FIG. 6 for the three determined clusters Cl-2, Cl-1 and Cl-4.

No mail item of the cluster Cl-4 was transported in the transport operation TV-1. TV-1 is therefore not determined.

At least one mail item from Cl-2, one from Cl-1, and one from Cl-4 were transported in each case in the transport operation TV-2. The transport operation TV-2 is therefore determined.

No mail item of the cluster Cl-2 was transported in the transport operation TV-3. TV-3 is therefore not determined.

No mail item of the cluster Cl-2 and also no mail item of the cluster Cl-1 or of the cluster Cl-4 were transported in the transport operation TV-4. TV-4 is therefore not determined.

Figure 9:
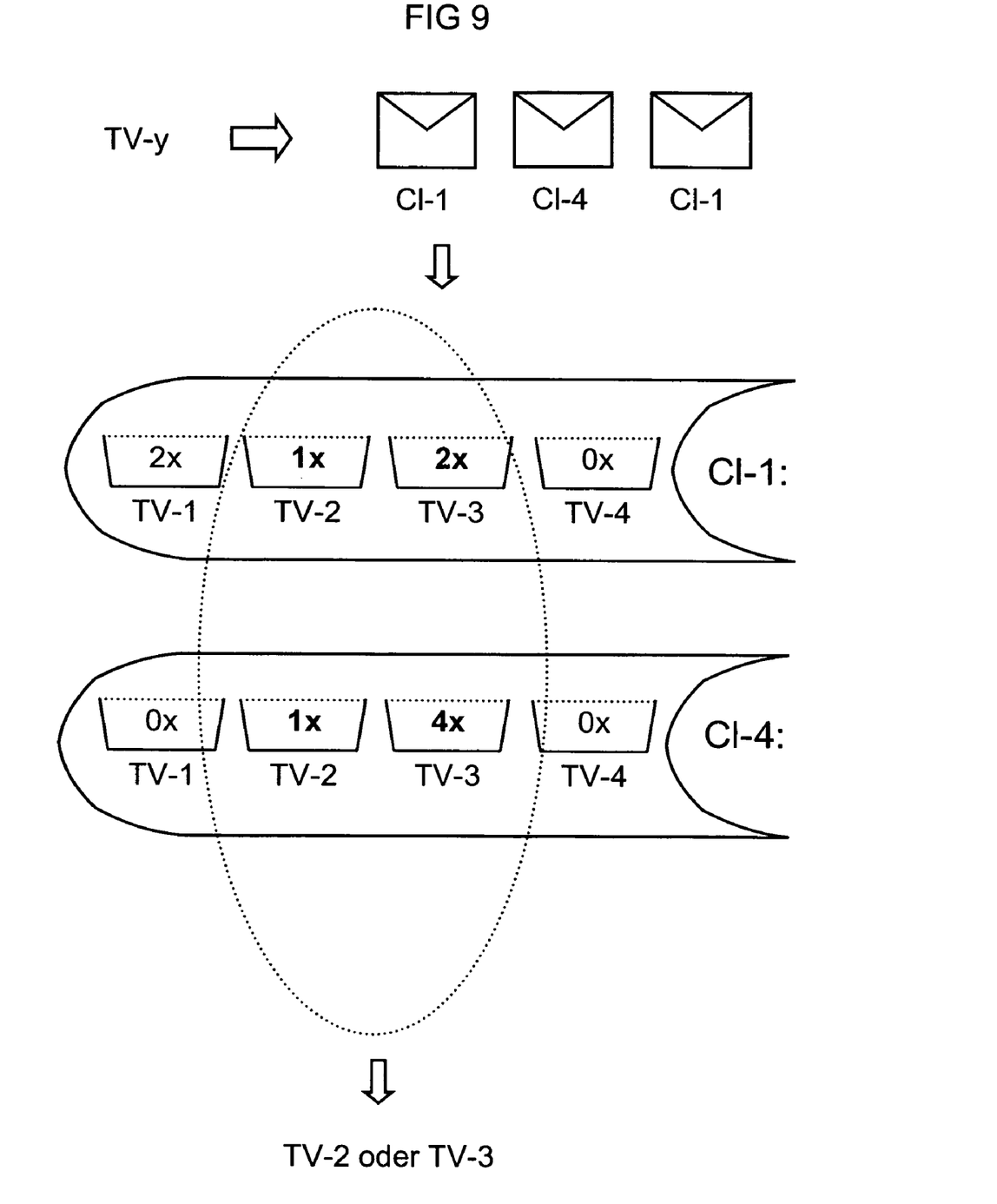
FIG. 9 shows the determining of the transport operation for the mail items C-1, ..., C-6 of the transport operation TV-y.

FIG. 9 illustrates the determining of the outgoing transport operation for the mail items of the incoming transport operation TV-y. The six mail items C-1, ..., C-6 are transported to the feeder device ZE-3 of the third sorting system Anl-3 by means of the transport operation TV-y.

Of the first three incoming mail items, two belong to the cluster Cl-4 and one to the cluster Cl-1. FIG. 9 shows the two transformed items of transport operation information from FIG. 6 for the two determined clusters Cl-1 and Cl-4.

No mail item of the cluster Cl-4 was transported in the transport operation TV-1. TV-1 is therefore not determined.

At least one mail item from Cl-2 and one from Cl-4 were transported in each case in the transport operation TV-2. The transport operation TV-2 is therefore determined.

At least one mail item from Cl-2 and one from Cl-4 were transported in each case in the transport operation TV-3. The transport operation TV-3 is therefore determined.

No mail item of the cluster Cl-1 and also no mail item of the cluster Cl-4 were transported in the transport operation TV-4. TV-4 is therefore not determined.

In this example two transport operations are therefore determined, namely TV-2 and TV-3.

Figure 10:
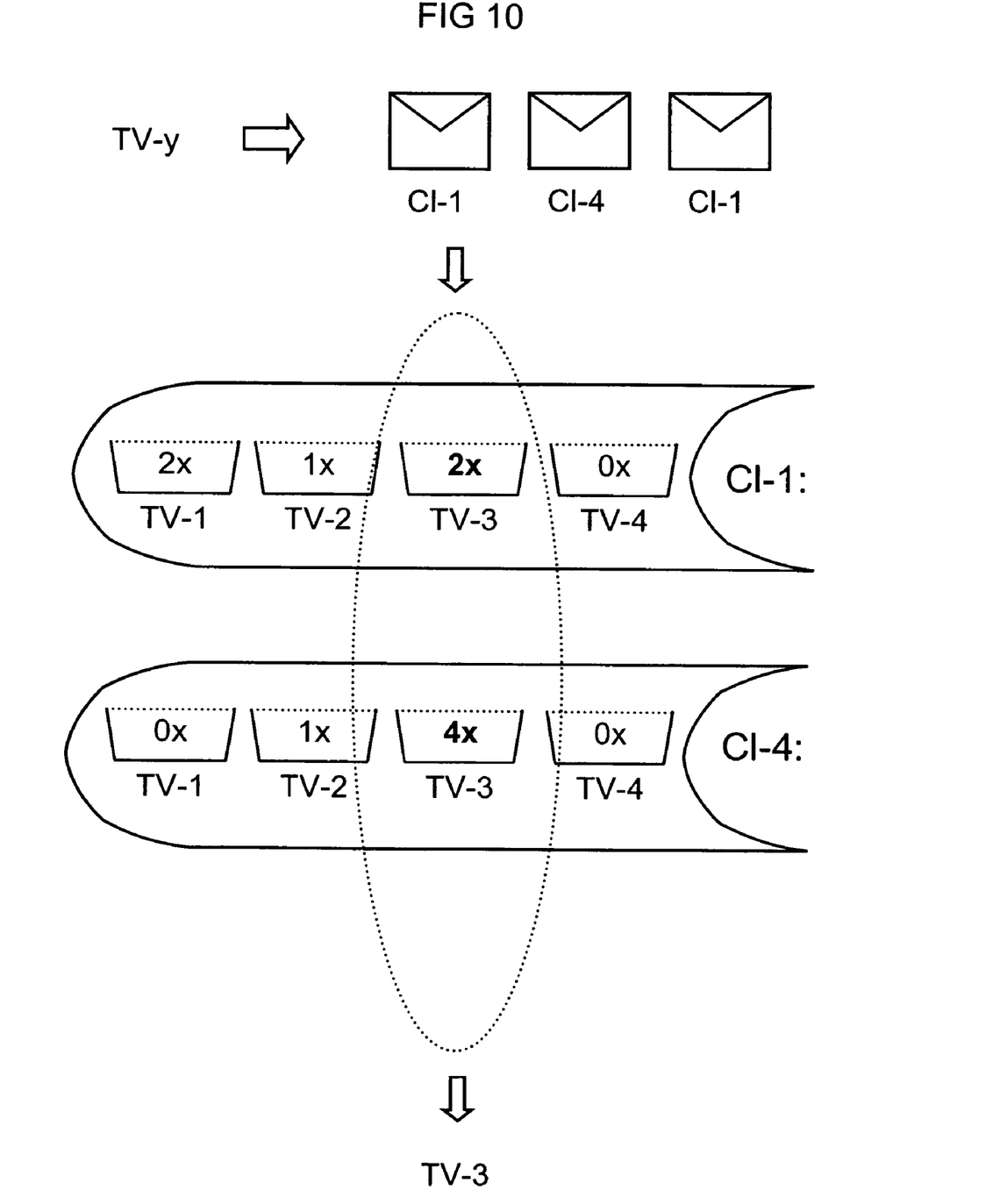
FIG. 10 shows the determining of FIG. 9, taking additional account of the numbers.

In a development of the embodiment the numbers of mail items are determined in addition. As explained above, two of the first three mail items of TV-y belong to Cl-1 and one to Cl-4. FIG. 10 shows the evaluation from FIG. 9, though with the numbers being taken into account in addition.

Only one mail item of the cluster Cl-1 is transported in the transport operation TV-2. With the numbers being taken into account in addition, TV-2 is therefore not determined.

Two mail items of the cluster Cl-1 and four mail items of the cluster Cl-4 are transported in the transport operation TV-3. Even with the numbers being taken into account in addition, TV-3 is therefore determined.

If the numbers are taken into account in addition, only TV-3 is therefore determined and TV-2 excluded.

The incoming transport operation TV-z consists of only two mail items. Consequently, only these two mail items D-1 and D-2 are measured initially. TV-4 is determined as the only outgoing transport operation.

Instead of or in addition to the number, the order in which the mail items are placed into the transport means used in each case can also be determined and evaluated. This presupposes that the mail items are also removed from the transport means again in that order.

In the exemplary embodiment the predefined number n is the same for each incoming transport operation unless fewer than n mail items are transported in the transport operation. However, it is also possible to keep n variable. For example, n is increased until such time as a single transport operation is determined or all mail items of an incoming transport operation have been measured.

In one embodiment the respective transport operation is determined exclusively by means of the above-described method. It is also possible to take into account in addition, during the determining of the transport operation, identifiers by means of which the transport means used are identified. For example, based on the identifier an attempt is made first to unambiguously determine the transport operation. If this does not succeed, the above-described method is applied. It is also possible, conversely, to determine transport operations first by means of the above-described method and to resolve ambiguities with the aid of the identifiers of transport means.

LIST OF REFERENCE SIGNS

| Reference sign | Meaning |
| --- | --- |
| A1, ..., A5 | Mail items from the collector bin Af-A, are transported to the feeder device ZE-3 in the transport operation TV-1 |
| Af-A | Collector bin of the sorting system Anl-1, receives the mail items A1, ..., A5 |

-continued

| Reference sign | Meaning |
|---|---|
| Af-B | Collector bin of the sorting system Anl-1, receives the mail items B1, ..., B4 |
| Af-C | Collector bin of the sorting system Anl-2, receives the mail items C1, ..., C6 |
| Af-D | Collector bin of the sorting system Anl-2, receives the mail items D1 and D2 |
| Anl-1 | First sorting system, has the collector bins Af-A and Af-B |
| Anl-2 | Second sorting system, has the collector bins Af-C and Af-D |
| Anl-3 | Third sorting system, has the feeder device ZE-3 |
| Anl-4 | Fourth sorting system, has the feeder device ZE-4 |
| B1, ..., B4 | Mail items from the collector bin Af-B, are transported to the feeder device ZE-4 in the transport operation TV-2 |
| Beh-1 | First container, is used for the transport operations TV-1 and TV-3 |
| Beh-2 | Second container, is used for the transport operations TV-2 and TV-4 |
| C1, ..., C6 | Mail items from the collector bin Af-C, are transported to the feeder device ZE-3 in the transport operation TV-3 |
| D1, D2 | Mail items from the collector bin Af-D, are transported to the feeder device ZE-4 in the transport operation TV-4 |
| Cl-1, ..., Cl-5 | Clusters, that is to say subsets in the feature space Merk-1, Merk-2 |
| DB | Central database |
| DVA | Data processing system; searches for the data record for a mail item and processes transport operation information |
| I TV-1 | Transport operation information relating to the outgoing transport operation TV-1 |
| I TV-2 | Transport operation information relating to the outgoing transport operation TV-2 |
| I TV-3 | transport operation information relating to the outgoing transport operation TV-3 |
| I TV-4 | transport operation information relating to the outgoing transport operation TV-4 |
| Merk-1, Merk-2 | Features of mail items; their values are measured twice |
| TV-1 | Outgoing transport operation in which the mail items A1, ..., A5 of Af-A are transported to the feeder device ZE-3 |
| TV-2 | Outgoing transport operation in which the mail items B1, ..., B4 of Af-B are transported to the feeder device ZE-4 |
| TV-3 | Outgoing transport operation in which the mail items C1, ..., C6 of Af-C are transported to the feeder device ZE-3 |
| TV-4 | Outgoing transport operation in which the mail items D1 and D2 of Af-D are transported to the feeder device ZE-4 |
| TV-w | Incoming transport operation in which the mail items A1, ..., A5 reach the feeder device ZE-3 |
| TV-x | Incoming transport operation in which the mail items B1, ..., B4 reach the feeder device ZE-4 |
| TV-y | Incoming transport operation in which the mail items C1, ..., C6 reach the feeder device ZE-3 |
| TV-z | Incoming transport operation in which the mail items D1 and D2 reach the feeder device ZE-4 |

The invention claimed is:

1. A method for transporting a plurality of objects, which method comprises the steps of:
performing a plurality of transport operations, wherein each transport operation includes the steps of:
transferring at least one object into a transportation unit;
transporting the transportation unit containing the at least one object to a processing system; and
feeding the at least one object transported by means of the transportation unit to the said processing system in such a manner that all objects from the transportation unit are fed to the said processing system before further objects are fed to it;
measuring for a first time a given feature for every object and determining a value of the given feature for the object;
for each transport operation, determining and storing a respective transport operation information, the transport operation information including information which objects are being transported together in this transport operation and the values of the given feature of these transported objects;
for each object after feeding the object to the processing system,
measuring for a second time the given feature for the object, and determining a value of the given feature for the object; and
searching that transport operation by which this object is transported; and
at least one transport operation further comprises the steps of:
performing for n objects all being transported by this transport operation the measurements executed for the second time such that these n measurements yield n feature values, where n>=2, and
determining every transport operation by which at least n object with these n measured feature values have been put into one transportation unit and have been transported with it,
whereby the n feature values and the transport operation information are used for this determination; and
for every object being transported by this transport operation to the processing system at least one transport operation determined in this way is used as the result of the search.

2. The method according to claim 1, including the steps of:
those objects which are jointly transported by one transport operation are arranged in a specific order in the transportation unit used for this transport operation, this order being determined and stored for this transport operation;
evaluating the order during the new n measurements for the n objects with the result that the n measurements yield a vector with n feature values vector; and
comparing the features value vector with the stored transport operation information when the at least one transport operation is determined.

3. The method according to claim 1, including the steps of:
providing each transportation unit with an identifier,
during the step of transferring those objects which are transported jointly by one transport operation in the used transportation unit the identifier of the transportation unit is determined;
the transport operation information includes information concerning which objects are transported together in the transportation unit having this determined identifier;
determining for each transportation unit its identifier a second time after the transportation unit being transported to the respective processing system; and
for determining the at least one transport operation using additionally the identifier.

4. The method according to claim 1, including the steps of:
providing every transport operation and every object each with an identifier; and
wherein the transport operation information of each transport operation includes the identifier of this transport operation and that of each object being transported by this transport operation.

5. The method according to claim 1, including the steps of:
in the case that for one transport operation several transport operations are determined by evaluating the n measurements, the following steps are performed,
for at least one further object having been transported by this transport operation the measurement is performed the second time such that this measurement yields an additional feature value, and
determining among the transport operations already determined every transport operation by which one object having this additional feature together with the n objects was transferred in a transportation unit and was transported with it.

6. The method according to claim 1, including the steps of:
providing m measurable features, where m>=2, to the objects;
each time an object is measured measuring the m values this object takes for the m features; and
using the m measured feature values as the feature value of the object.

7. The method according to claim 1, including the steps of:
providing a marking for each object;
during measuring for every object a first time, reading for every object the marking of this object;
creating and storing a data record which includes the feature value measured during the first measurement and an identification of the marking , after transporting the object to the processing system, for each object, after transporting the object to the processing system, determining the stored data record using
the at least one feature value measured during the new measurement and
the at least one transport operation determined by the search.

8. The method according to claim 7, including the steps of:
providing as the marking each object with a destination point to which the object is to be transported; and
initiating, with the processing system a transport of the object to that destination point whose identification is comprehended by the determined data record.

9. A device for transporting a plurality of objects, comprising:
a sending processing system, a receiving processing system, and a database,
the device being configured to perform a plurality of transport operations;
the device being configured for performing in each transport operation the following steps:
transferring at least one object from said sending processing system into a transportation unit,
transporting said transportation unit with the at least one object to said receiving processing system, and
feeding the at least one object transported with said transportation unit to said receiving processing system in such a manner that all objects from said transportation unit are fed to the said processing system before further objects are fed to it;
whereas said sending processing system is construed for:
measuring for every object a first time which value a given feature takes for this object,
for each transport operation determining the respective transport operation information which objects are being transported together in this transport operation and storing this transport operation information in the database;
whereas said receiving processing system is construed for performing the following steps for each object transported to it:
measuring a second time which value the said feature takes for this object, and
by searching in the database determining with which transport operation this object has been transported, and
said receiving processing system is construed for:
performing for n objects all being transported by the same transport operation the measurements executed for the second time such that these n measurements yield n feature values, wherein n>=2, and
determining every transport operation by which at least n objects with these n measured feature values have been put into one transportation unit and have been transported with it,
wherein the receiving processing system uses for this determination the n feature values and the stored transport operation information, and
for every object being transported by this transport operation to the processing system using the at least one transport operation determined in this way as the result of the search.

* * * * *